United States Patent
Bonnet

(10) Patent No.: US 8,414,261 B2
(45) Date of Patent: Apr. 9, 2013

(54) NOISE REDUCER FOR ROTOR BLADE IN WIND TURBINE

(75) Inventor: Laurent Bonnet, Mesum (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/149,513

(22) Filed: May 31, 2011

(65) Prior Publication Data
US 2012/0027590 A1  Feb. 2, 2012

(51) Int. Cl.
*F01D 5/14* (2006.01)

(52) U.S. Cl. ........... 416/1; 416/62; 416/228; 416/236 R; 415/119

(58) Field of Classification Search ............... 244/200.1, 244/215; 415/119; 416/62, 228, 235, 236 R
See application file for complete search history.

(56) References Cited

U.S. PATENT DOCUMENTS

| | | |
|---|---|---|
| 175,355 A | 3/1876 | King |
| 573,562 A | 12/1896 | Wittram |
| 1,861,065 A | 5/1932 | Poot |
| RE19,412 E | 1/1935 | Zaparka |
| 2,071,012 A | 2/1937 | Adams |
| 2,225,312 A | 12/1940 | Mason |
| 2,238,749 A | 4/1941 | Peltier |
| D131,271 S | 2/1942 | Colura |
| 2,312,219 A | 2/1943 | Sensenich |
| 2,469,167 A | 5/1949 | Little |
| 2,616,509 A | 11/1952 | Thomas |
| 2,899,128 A | 8/1959 | Vaghi |
| 4,089,618 A | 5/1978 | Patel |
| 4,204,629 A | 5/1980 | Bridges |
| 4,618,313 A | 10/1986 | Mosiewicz |
| 4,720,244 A | 1/1988 | Kluppel et al. |
| 4,962,826 A | 10/1990 | House |
| 5,088,665 A | 2/1992 | Vijgen et al. |
| 5,320,491 A | 6/1994 | Coleman et al. |

(Continued)

FOREIGN PATENT DOCUMENTS

| | | |
|---|---|---|
| DE | 10 2006 043 462 A1 | 3/2008 |
| DE | 102006043462 | 3/2008 |

(Continued)

OTHER PUBLICATIONS

Co-pending U.S. Appl. No. 121861,145, filed on Aug. 23, 2010.

(Continued)

*Primary Examiner* — Edward Look
*Assistant Examiner* — Jason Davis
(74) *Attorney, Agent, or Firm* — Dority & Manning, P.A.

(57) ABSTRACT

A rotor blade assembly and a method for reducing the noise of a rotor blade for a wind turbine are disclosed. The rotor blade has surfaces defining a pressure side, a suction side, a leading edge, and a trailing edge extending between a tip and a root. The rotor blade assembly further includes a noise reducer configured on a surface of the rotor blade, the noise reducer including a plurality of noise reduction features. Each of the plurality of noise reduction features includes a first surface and a second surface. The first surface includes a first portion mounted to one of the pressure side or the suction side and a second portion configured to interact with wind flowing past the other of the pressure side or the suction side. The second surface interrupts an aerodynamic contour of the one of the pressure side or the suction side.

18 Claims, 4 Drawing Sheets

U.S. PATENT DOCUMENTS

| | | | |
|---|---|---|---|
| 5,328,329 | A | 7/1994 | Monroe |
| 5,522,266 | A | 6/1996 | Nicholson et al. |
| 5,533,865 | A | 7/1996 | Dassen et al. |
| 5,819,357 | A | 10/1998 | Gould |
| 6,352,601 | B1 | 3/2002 | Ray |
| 6,491,260 | B2 | 12/2002 | Borchers et al. |
| 6,729,846 | B1 | 5/2004 | Wobben |
| 6,733,240 | B2 | 5/2004 | Gilebe |
| 6,779,978 | B2 | 8/2004 | Camargo Do Amarante |
| 6,789,769 | B2 | 9/2004 | Mau et al. |
| 6,830,436 | B2 * | 12/2004 | Shibata et al. ............... 416/228 |
| 7,059,833 | B2 | 6/2006 | Stiesdal et al. |
| 7,328,770 | B2 | 2/2008 | Owens et al. |
| 7,351,041 | B2 | 4/2008 | Uselton et al. |
| 7,413,408 | B1 | 8/2008 | Tafoya |
| 7,458,777 | B2 | 12/2008 | Herr |
| 7,632,068 | B2 | 12/2009 | Bak et al. |
| 7,637,721 | B2 | 12/2009 | Driver et al. |
| 7,740,206 | B2 | 6/2010 | Eaton et al. |
| 7,976,283 | B2 | 7/2011 | Huck |
| 2001/0008032 | A1 | 7/2001 | Llewellyn-Jones et al. |
| 2003/0175121 | A1 | 9/2003 | Shibata et al. |
| 2004/0253114 | A1 | 12/2004 | Gunneskov et al. |
| 2007/0025858 | A1 | 2/2007 | Driver et al. |
| 2007/0041823 | A1 | 2/2007 | Miller |
| 2007/0065290 | A1 | 3/2007 | Herr |
| 2007/0077150 | A1 | 4/2007 | Llorente Gonzalez |
| 2007/0294848 | A1 | 12/2007 | Dumler |
| 2008/0001363 | A1 | 1/2008 | Bhate |
| 2008/0061192 | A1 | 3/2008 | Sullivan |
| 2008/0080977 | A1 | 4/2008 | Bonnet |
| 2008/0107540 | A1 | 5/2008 | Bonnet |
| 2008/0166241 | A1 | 7/2008 | Herr et al. |
| 2008/0187442 | A1 | 8/2008 | Standish et al. |
| 2008/0298967 | A1 * | 12/2008 | Matesanz Gil et al. ... 416/146 R |
| 2009/0016891 | A1 | 1/2009 | Parsania et al. |
| 2009/0074585 | A1 * | 3/2009 | Koegler et al. ............... 416/228 |
| 2009/0097976 | A1 | 4/2009 | Driver et al. |
| 2009/0104038 | A1 | 4/2009 | Grabau |
| 2009/0126131 | A1 | 5/2009 | Delaere et al. |
| 2009/0274559 | A1 | 11/2009 | Petsche et al. |
| 2010/0028161 | A1 | 2/2010 | Vronsky et al. |
| 2010/0068042 | A1 | 3/2010 | Brück et al. |
| 2010/0101037 | A1 | 4/2010 | Gross et al. |
| 2010/0104436 | A1 | 4/2010 | Herr et al. |
| 2010/0260614 | A1 | 10/2010 | Fuglsang et al. |
| 2010/0278657 | A1 | 11/2010 | Kildegaard |
| 2010/0329879 | A1 | 12/2010 | Presz, Jr. et al. |
| 2011/0018282 | A1 | 1/2011 | Hayashi et al. |
| 2011/0042524 | A1 | 2/2011 | Hemmelgarn et al. |
| 2011/0142637 | A1 * | 6/2011 | Riddell et al. .................. 416/62 |
| 2011/0223030 | A1 * | 9/2011 | Huck et al. .................... 416/228 |
| 2012/0027590 | A1 | 2/2012 | Bonnet |
| 2012/0057984 | A1 | 3/2012 | Fuglsang et al. |

FOREIGN PATENT DOCUMENTS

| | | |
|---|---|---|
| EP | 0 652 367 | 5/1995 |
| EP | 2028366 | 2/2009 |
| EP | 2031242 | 3/2009 |
| EP | 2031244 | 3/2009 |
| EP | 2053240 | 4/2009 |
| EP | 2 138 714 A1 | 12/2009 |
| EP | 2138714 | 12/2009 |
| EP | 2216545 | 8/2010 |
| EP | 2 253 838 A1 | 11/2010 |
| EP | 2253838 | 11/2010 |
| EP | 2253839 | 11/2010 |
| EP | 2 270 312 A1 | 1/2011 |
| EP | 2270312 | 1/2011 |
| JP | 2000120524 | 4/2000 |
| JP | 2003254225 | 9/2003 |
| WO | WO 98/21091 | 5/1998 |
| WO | WO 2004/088130 | 10/2004 |
| WO | WO 2008035149 | 3/2008 |
| WO | WO 2008/113349 | 9/2008 |
| WO | WO 2008/131800 | 11/2008 |
| WO | WO 2009/025549 | 2/2009 |

OTHER PUBLICATIONS

Co-pending U.S. Appl. No. 12/946,259, filed on Nov. 15, 2010.
Co-pending U.S. Appl. No. 12/939,531, filed on Nov. 4, 2010.
Co-pending U.S. Appl. No. 12/943,135, filed on Nov. 10, 2010.
Co-pending U.S. Appl. No. 12/970,119, filed on Dec. 16, 2010.
Office Action issued in connection with Danish Patent Application No. PA201270120, May 24, 2012.
Risoe National Laboratory for Sustainable Energy, "Controllable Rubber Trailing Edge Flap May Ease Stress on Wind Turbine Blades". Renewable Energy World.com, pp. 1-3, Feb. 17, 2010.
Risoe National Laboratory for Sustainable Energy, "Successful Wind Tunnel Test of Controllable Rubber Trailing Edge Flap for Wind Turbine Blades", Science Daily, pp, 1-2, Feb. 19, 2010.
Risoe National Laboratory for Sustainable Energy, The Technical University of Denmark, "Flexible Trailing Edge Flap for Blades to Make Wind PPower Cheaper". Science Daily, pp. 1-2, Apr. 7, 2011.

* cited by examiner

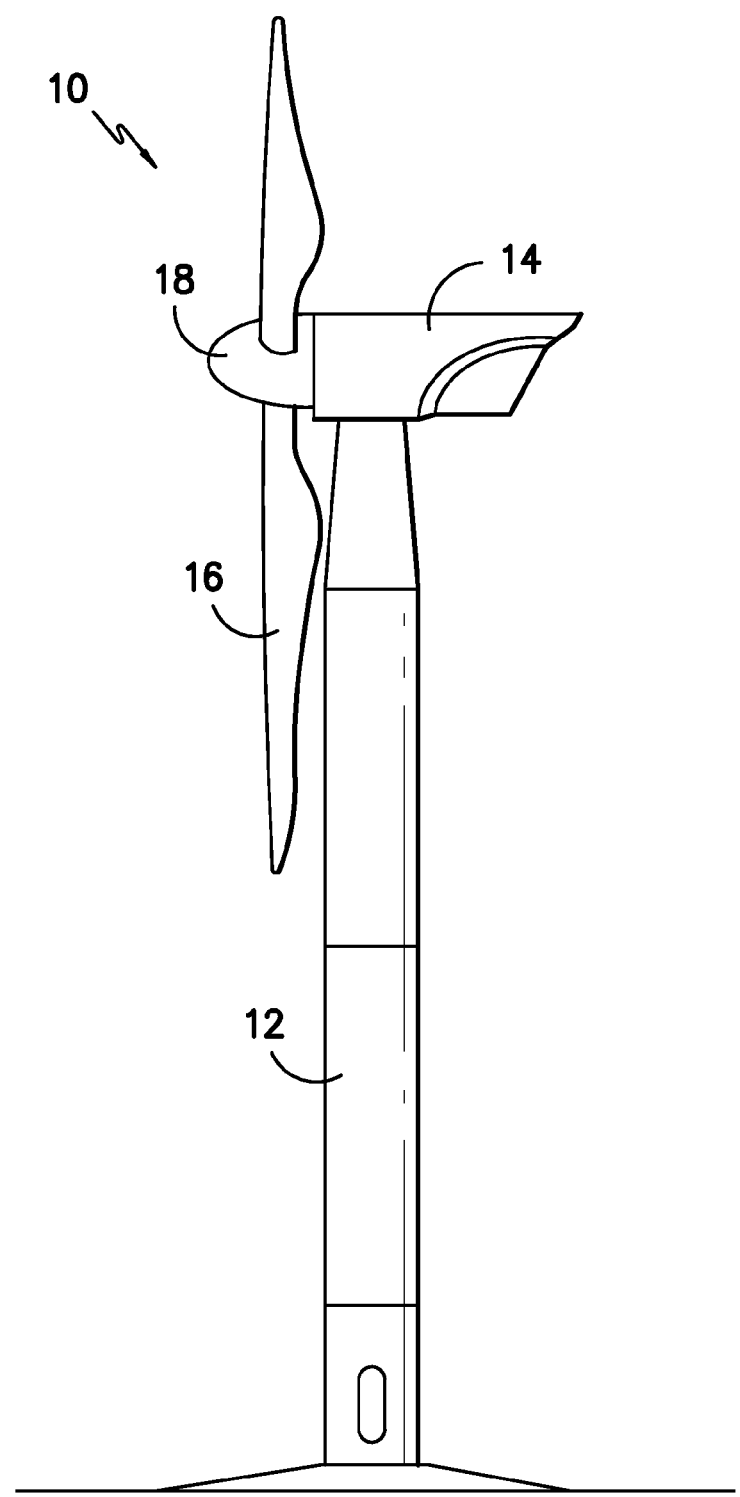
FIG. -1-

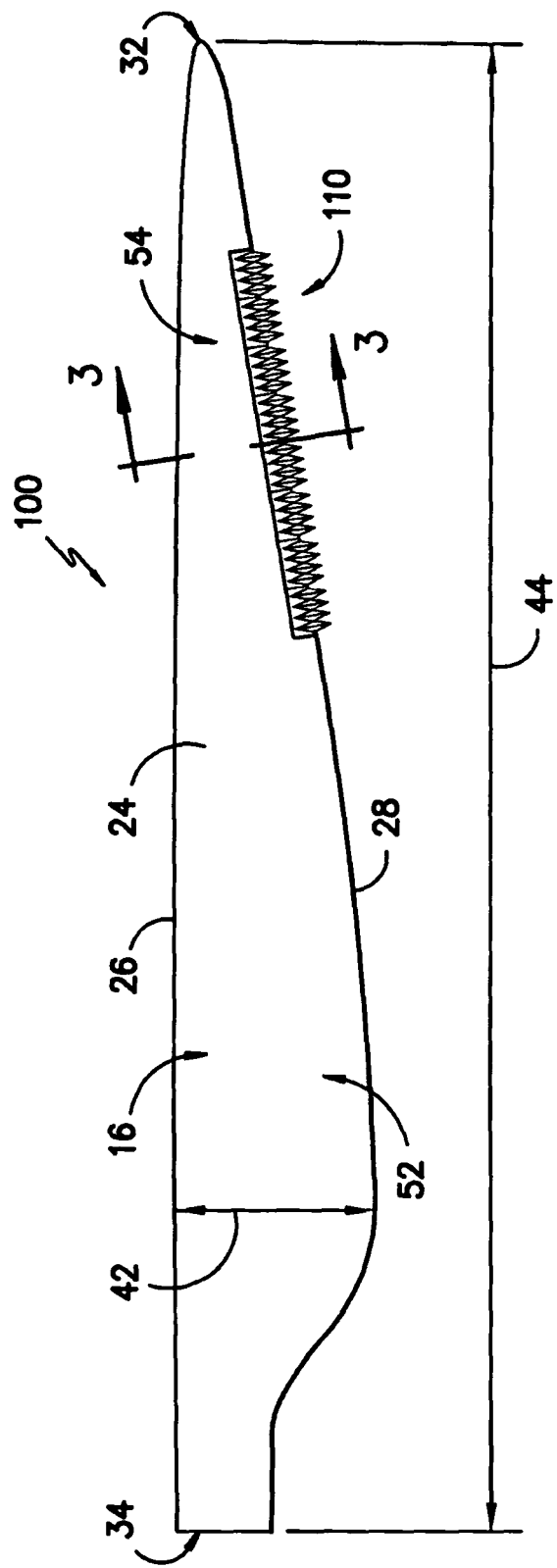
FIG. -2-

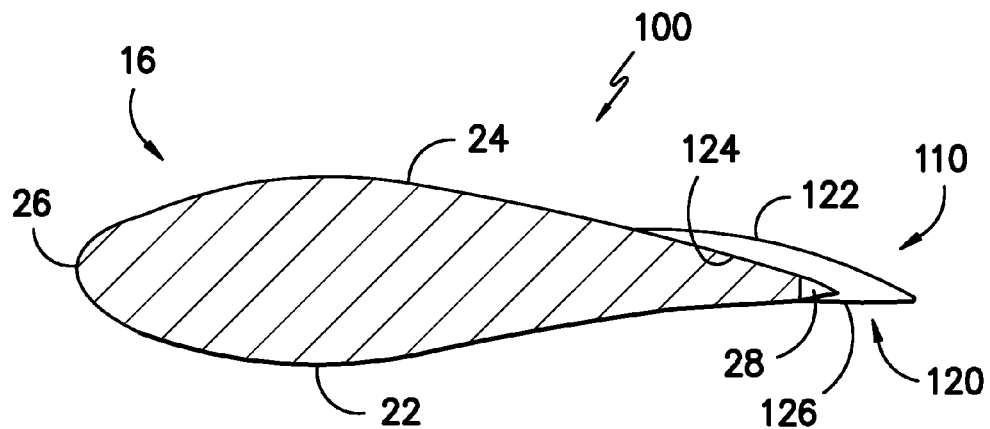
FIG. -3-
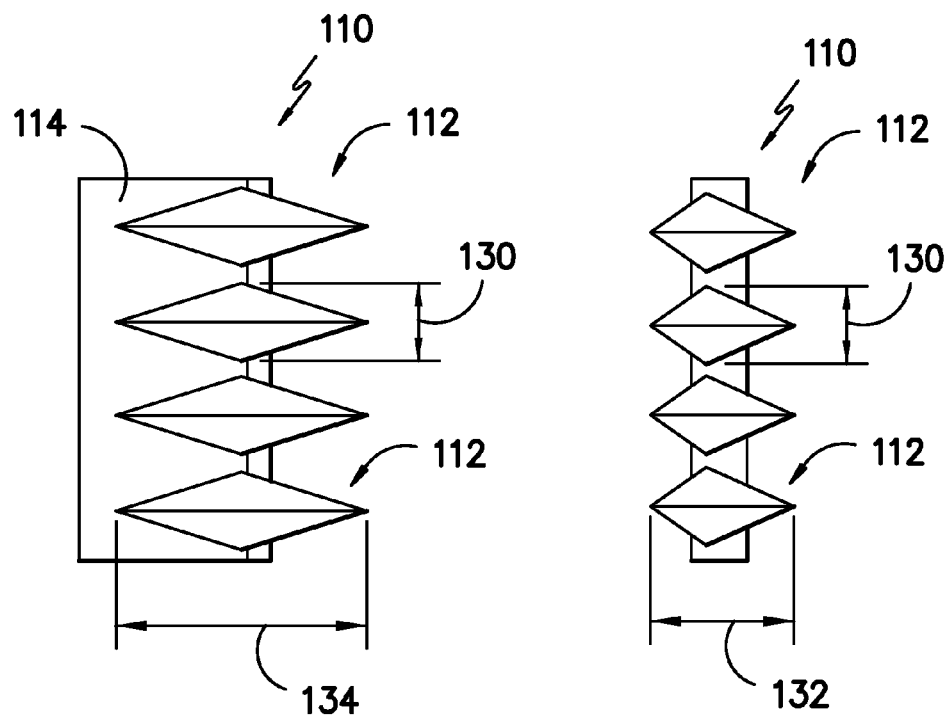
FIG. -4-   FIG. -5-

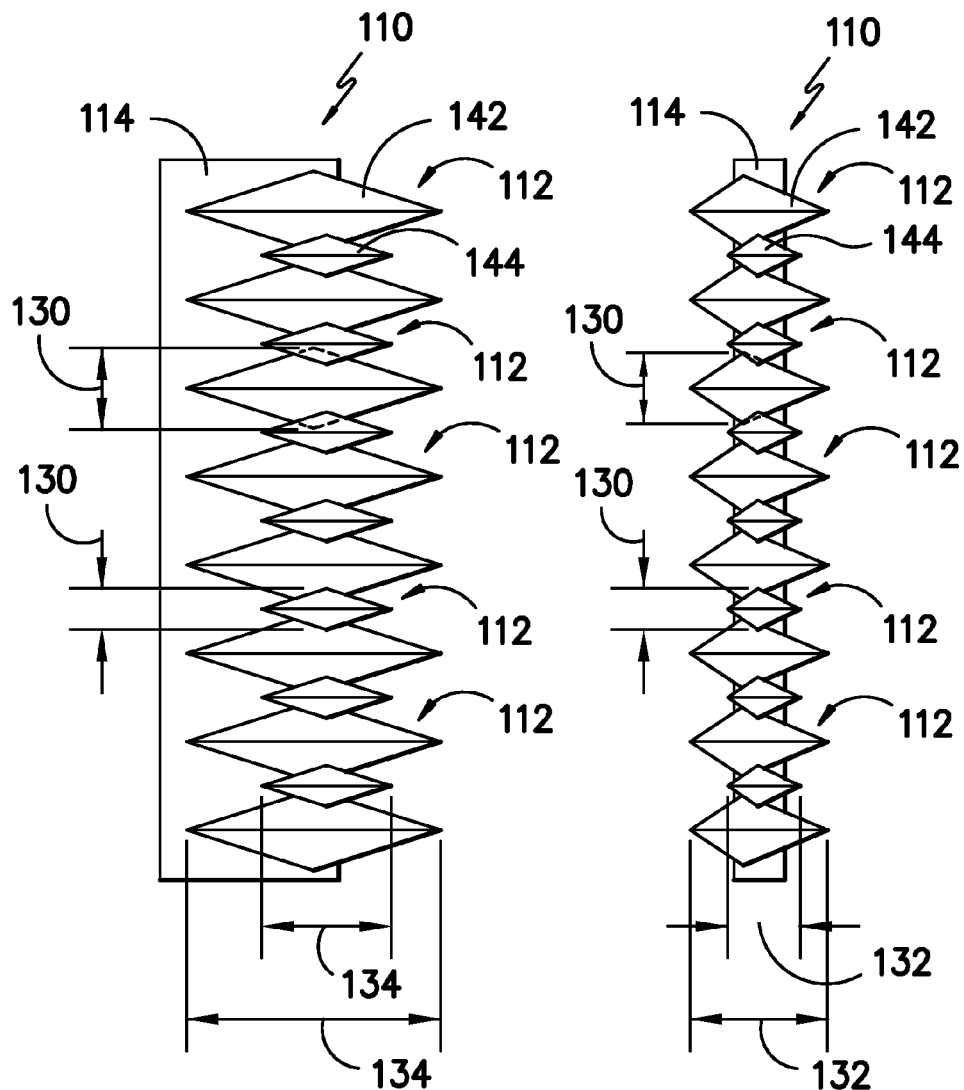
FIG. -6-  FIG. -7-
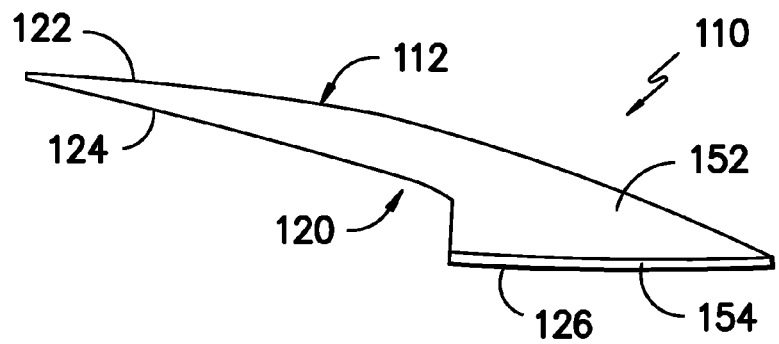
FIG. -8-

NOISE REDUCER FOR ROTOR BLADE IN WIND TURBINE

FIELD OF THE INVENTION

The present disclosure relates in general to wind turbine rotor blades, and more particularly to noise reducers configured on the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

As rotor blades and wind turbines in general become capable of capturing increased kinetic energy, the acoustic noise associated with operation of the wind turbine may similarly increase. Thus, in many cases, known wind turbines and rotor blades may require that the amount of kinetic energy captured be compromised in order to prevent excessive associated noise. In many cases, noise reducers are attached to the rotor blades of wind turbines to reduce the noise and increase the efficiency associated with the rotor blades. These components may frequently be attached adjacent the trailing edges of the rotor blades. However, typical prior art noise reducers have a variety of disadvantages, and may not adequately reduce the noise associated with typical rotor blades. For example, many rotor blades and associated noise reducers are designed for a maximum lift and associated noise at only one operating point. The combination of a rotor blade and prior art noise reducer may adequately reduce noise at this operating point, but cannot be accurately adjusted to multiple operating points and/or extended ranges while reducing or maintaining the associated noise.

Thus, an improved noise reducer for a rotor blade would be desired. For example, a noise reducer with improved noise reduction features would be advantageous. Specifically, a noise reducer with noise reduction features that have improved responses to wind flow over the noise reducer would be desired.

BRIEF DESCRIPTION OF THE INVENTION

Aspects and advantages of the invention will be set forth in part in the following description, or may be obvious from the description, or may be learned through practice of the invention.

In one embodiment, a rotor blade assembly for a wind turbine is disclosed. The rotor blade has surfaces defining a pressure side, a suction side, a leading edge, and a trailing edge extending between a tip and a root. The rotor blade assembly further includes a noise reducer configured on a surface of the rotor blade, the noise reducer including a plurality of noise reduction features. Each of the plurality of noise reduction features includes a first surface and a second surface. The first surface includes a first portion mounted to one of the pressure side or the suction side and a second portion configured to interact with wind flowing past the other of the pressure side or the suction side. The second surface interrupts an aerodynamic contour of the one of the pressure side or the suction side.

In another embodiment, a method for reducing the noise of a rotor blade for a wind turbine is disclosed. The method includes mounting a noise reducer on a rotor blade, and rotating the rotor blade on the wind turbine. The noise reducer including a plurality of noise reduction features. Each of the plurality of noise reduction features includes a first surface and a second surface. The first surface includes a first portion mounted to one of the pressure side or the suction side and a second portion configured to interact with wind flowing past the other of the pressure side or the suction side. The second surface interrupts an aerodynamic contour of the one of the pressure side or the suction side.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is a top view of a rotor blade assembly according to one embodiment of the present disclosure;

FIG. 3 is a cross-sectional view, along the lines 3-3 of FIG. 2, of a rotor blade assembly according to one embodiment of the present disclosure;

FIG. 4 is a top view of a noise reducer according to one embodiment of the present disclosure;

FIG. 5 is a rear view of the noise reducer of FIG. 4;

FIG. 6 is a top view of a noise reducer according to another embodiment of the present disclosure;

FIG. 7 is a rear view of the noise reducer of FIG. 6; and,

FIG. 8 is a side view of a noise reducer according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade 16 according to the present disclosure may include exterior surfaces defining a pressure side 22 and a suction side 24 (see FIGS. 3 through 5 and 7) extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIGS. 2 and 4, the chord 42 may vary throughout the span 44 of the rotor blade 16. Thus, a local chord may be defined for the rotor blade 16 at any point on the rotor blade 16 along the span 44.

Additionally, the rotor blade 16 may define an inner board area 52 and an outer board area 54. The inner board area 52 may be a span-wise portion of the rotor blade 16 extending from the root 34. For example, the inner board area 52 may, in some embodiments, include approximately 33%, 40%, 50%, 60%, 67%, or any percentage or range of percentages therebetween, or any other suitable percentage or range of percentages, of the span 44 from the root 34. The outer board area 54 may be a span-wise portion of the rotor blade 16 extending from the tip 32, and may in some embodiments include the remaining portion of the rotor blade 16 between the inner board area 52 and the tip 32. Additionally or alternatively, the outer board area 54 may, in some embodiments, include approximately 33%, 40%, 50%, 60%, 67%, or any percentage or range of percentages therebetween, or any other suitable percentage or range of percentages, of the span 44 from the tip 32.

As illustrated in FIGS. 2 through 8, the present disclosure may further be directed to a rotor blade assembly 100. The rotor blade assembly 100 may include a noise reducer 110 and the rotor blade 16. In general, the noise reducer 110 may be configured on a surface of the rotor blade 16, and may reduce the aerodynamic noise being emitted from the rotor blade 16 during operation of the wind turbine 10 and/or increase the efficiency of the rotor blade 16. In an exemplary embodiment of the present disclosure, the noise reducer 110 may be configured on a surface of the rotor blade 16 adjacent the trailing edge 28 of the rotor blade 16. Alternatively, the noise reducer 110 may be configured on a surface of the rotor blade 16 adjacent the leading edge 26 of the rotor blade 16, or adjacent the tip 32 or the root 34 of the rotor blade 16, or at any other suitable position on the rotor blade 16.

In exemplary embodiments, as shown in FIG. 2, the noise reducer 110 may configured on, such as mounted to, the pressure side 22 of the rotor blade 16. In alternative embodiments, the noise reducer 110 may be configured on, such as mounted to, the suction side 24.

As shown in FIGS. 2 and 4 through 7, the noise reducer 110 of the present disclosure includes a plurality of noise reduction features 112. In general, the noise reduction features 112 may interact with the wind flow past the noise reducer 110 when the rotor blade assembly 100 is in operation, and may reduce the noise associated with the rotor blade 16.

In some embodiments, as shown in FIG. 2, the noise reducer 110 may include a base plate 114. In these embodiments, the base plate 114 may generally be that portion of the noise reducer 110 that is mounted to the rotor blade 16 to configure the noise reducer 110 on a surface of the rotor blade 16, and the noise reduction features 112 may extend from the base plate 114. In other words, the base pate 114 may mount each of the noise reduction features 112 to a surface of the rotor blade 16. Alternatively, the noise reduction features 112 may be mounted directly to the rotor blade 16, or may be an integral part of the rotor blade 16.

The noise reducer 110 may, in some embodiments, be formed from a plurality of noise reducer sections. Each section may include one or more noise reduction features 112, and each section may further include a base plate portion. Alternatively, the noise reducer 110 may be a singular, unitary component.

A noise reduction feature 112 generally includes a first surface 120 and a second surface 122. The first surface 120 includes a first portion 124 and a second portion 126, as shown in FIGS. 3 and 8. The first portion 124 is mounted to a surface of the rotor blade 16, such as the pressure side 22 or the suction side 24. FIG. 3, for example, illustrates a first portion 124 mounted to the suction side 24. Thus, the first portion 124 may have a generally aerodynamic contour that corresponds to the aerodynamic contour of the surface to which it is mounted. Further, it should be noted that in embodiments wherein the noise reducer 110 includes a base plate 114, the first portion 124 of a noise reduction feature 112 may be mounted to the base plate 114, and the base plate 114 may mount the first portion 124 to a surface of the rotor blade 16.

In some embodiments, a first portion 124 may be mounted to a surface of the rotor blade 16 within the outer board area 54 of the rotor blade 16. Additionally or alternatively, a first portion 124 may be mounted to a surface of the rotor blade 16 within the inner board area 52 of the rotor blade 16, or at any suitable location on the rotor blade 16.

The second portion 126 is configured to interact with wind flowing past another surface of the rotor blade 16, such as the other of the pressure side 22 or the suction side 24. Thus, the second portion 126 is exposed to the wind flow, and may increase the chord 42 of the rotor blade assembly 100 at least at the locations of the noise reduction features 112 on the rotor blade assembly 100. FIG. 3, for example, illustrates a second portion 126 configured to interact with wind flowing past the pressure side 22. As wind flows past the rotor blade assembly 100, the wind may flow past a surface of the rotor blade 16, and then flow past the second portions 126 of the noise reduction features 112. When the wind flows past the second portions 126, the wind may interact with the second portions 126, reducing the noise of the wind flowing past the rotor blade assembly 100.

The second surface 122 interrupts the aerodynamic contour of a surface of the rotor blade 16, such as the pressure side 22 or the suction side 24, as shown in FIGS. 2 through 7. FIG. 3, for example, illustrates a second surface 122 interrupting the aerodynamic contour of the suction side 24. For example, as shown, the second surface 122 of each of the noise reduction features 112, when the noise reducer 110 is mounted to a surface of the rotor blade 16, protrudes from that surface of the rotor blade 16, thus interrupting the aerodynamic contour of that surface. FIG. 3, for example, illustrates a second surface 122 interrupting the aerodynamic contour of the suction side 24. As wind flows past the rotor blade assembly 100, the wind may flow past a surface of the rotor blade 16, and then flow past the second surface 122 of the noise reduction features 112. When the wind flows past the second surfaces 122, the wind may interact with the second surfaces 122, reducing the noise of the wind flowing past the rotor blade assembly 100.

In some embodiments, the second surface 122 of a noise reduction feature 112 may have a generally curvilinear cross-sectional profile, as shown in FIGS. 3 and 8. Alternatively, the second surface 122 may have a generally linear cross-sectional profile or any other suitable cross-sectional profile.

As shown in FIGS. 4 through 7, each of the plurality of second surfaces 122 defines a width 130, a height 132, and a length 134. In some embodiments, the width 130 of a second surface 122 may taper in various directions throughout various portions of the length 134. For example, as shown in FIGS. 4 and 6, the width 130 may taper in the direction of the wind flow through a portion of the length 134 and/or taper in the opposite direction of the wind flow through a portion of the length 134. In some embodiments, the portion that tapers in the direction of the wind flow may be a downstream portion of the second surface 122, such as a downstream fourth, a downstream third, a downstream half, or any other suitable downstream portion of the second surface 122. In other embodiments, the portion that tapers in the direction of the wind flow may be an upstream portion, or any other suitable portion of the second surface 122. Additionally or alternatively, in some embodiments, the portion that tapers in the opposite direction of the wind flow may be an upstream portion of the second surface 122, such as an upstream fourth, an upstream third, an upstream half, or any other suitable upstream portion of the second surface 122. In other embodiments, the portion that tapers in the direction of the wind flow may be a downstream portion, or any other suitable portion of the second surface 122.

Further, in some embodiments, the height 132 of a second surface 122 may taper in various directions throughout various portions of the length 134. For example, as shown in FIGS. 5 and 7, the height 132 may taper in the direction of the wind flow through a portion of the length 134 and/or taper in the opposite direction of the wind flow through a portion of the length 134. In some embodiments, the portion that tapers in the direction of the wind flow may be a downstream portion of the second surface 122, such as a downstream fourth, a downstream third, a downstream half, or any other suitable downstream portion of the second surface 122. In other embodiments, the portion that tapers in the direction of the wind flow may be an upstream portion, or any other suitable portion of the second surface 122. Additionally or alternatively, in some embodiments, the portion that tapers in the opposite direction of the wind flow may be an upstream portion of the second surface 122, such as an upstream fourth, an upstream third, an upstream half, or any other suitable upstream portion of the second surface 122. In other embodiments, the portion that tapers in the direction of the wind flow may be a downstream portion, or any other suitable portion of the second surface 122.

Each noise reduction feature 112 may have a similar shape and size, or various groups of noise reduction features 112 may have similar shapes and sizes, or each noise reduction feature 112 may have an individual shape and size. In some exemplary embodiments, for example, the noise reducer 110 may include a plurality of noise reduction features 112. The plurality of noise reduction features 112 may include a first noise reduction feature 142 and a second noise reduction feature 144, or a plurality of first noise reduction features 142 and second noise reduction features 144, as shown in FIGS. 6 and 7. In some embodiments, the first noise reduction features 142 may each have a first aspect ratio, and the second noise reduction features 144 may each have a second aspect ratio different from the first aspect ratio. Additionally or alternatively, the first noise reduction features 142 may have generally identical or different widths 130, heights 132, and/or lengths 134, and the second noise reduction features 144 may have generally identical or different widths 130, heights 132, and/or lengths 134. Further, the widths 130, heights 132, and/or lengths 134 of the first noise reduction features 142 may be identical to or different from the widths 130, heights 132, and/or lengths 134 of the second noise reduction features 144. Additionally or alternatively, the first noise reduction features 142 may have generally identical or different shapes, and the second noise reduction features 144 may have generally identical or different shapes. Further, the shapes of the first noise reduction features 142 may be identical to or different from the shapes of the second noise reduction features 144. In exemplary embodiments, the first noise reduction features 142 and second noise reduction features 144 may alternate through the length, or any portion thereof, of the noise reducer 110. Alternatively, the first noise reduction features 142 and second noise reduction features 144 may be defined in any suitable arrangement or pattern.

Further, it should be understood that the present disclosure is not limited to first noise reduction features 142 and second noise reduction features 144, and rather that any suitable number of noise reduction feature groups with any suitable aspect ratios or other features and in any suitable arrangement are within the scope and spirit of the present disclosure.

As shown in FIG. 8, in some embodiments, the noise reducer 110 of the present disclosure may further include a first layer 152 and a second layer 154. The first layer 152 may include the first portion 124 and the second surface 122, and the second layer 154 may include the second portion 126. Alternatively, each of the first layer 152 and the second layer 154 may include any suitable layer or portion of a layer.

One of the first layer 152 or the second layer 154, such as in exemplary embodiments the first layer 152, may be formed from an acoustic absorption material. The acoustic absorption material may absorb noise associated with the rotor blade 16 and rotor blade assembly 100 by absorbing a portion of the noise. For example, the acoustic absorption material may be a generally acoustically porous material. Acoustically porous material allows air to permeate the material, and the frictional interaction between the acoustically porous material and the air absorbs, dissipates, and thus reduces the noise. The acoustically porous material may be, for example, an acoustically porous cell foam material, such as polyurethane foam, polyether foam, melamine foam, or any other suitable foam. Alternatively, the acoustically porous material may be, for example, an acoustically porous natural fiber material agglomerate, such as wood fiber, coconut fiber, or any other suitable fiber. Alternatively, the acoustically porous material may be, for example, a single or multi-layer cloth material, such as cotton, linen, hemp, or any other suitable cloth material. It should be understood, however, that the acoustic absorption material according to the present disclosure is not limited to the above disclosed materials, and rather that any suitable acoustically absorbable materials are within the scope and spirit of the present disclosure.

Further, in exemplary embodiments, the layer formed from the acoustic absorption material may have an absorption coefficient. In exemplary embodiments, the absorption coefficient may be in the range between approximately 0.6 and 1.0. However, it should be understood that the absorption coefficient is not limited to the above disclosed range, and rather that any suitable range is within the scope and spirit of the present disclosure.

The other of the first layer 152 or the second layer 154, such as in exemplary embodiments the second layer 154, may be formed from a material that is stiffer and/or stronger than the material of the first layer 152 or the second layer 154. This material may act as a protective layer and/or strengthening or stiffening layer for the noise reducer 110. Further, in exemplary embodiments, the material may be acoustically non-porous. Thus, the material may be, for example, a polymer, such as a thermoplastic, a fiber or woven-fiber reinforced plastic, a metal, or any other suitable material. Further, in exemplary embodiments, the other of the first layer 152 or the second layer 154 comprising this material may be relatively thin compared to the first layer 152 or the second layer 154.

In exemplary embodiments, the noise reducer 110 is adaptable to the wind flow past the rotor blade assembly 100. For example, wind flowing past the rotor blade assembly 100 forms flow streamlines. A mean flow streamline may further be calculated, as is generally known in the art. Further the flow streamlines and/or mean flow streamline may change based on the angle of attack of the rotor blade 16. The noise reducer 110, such as the layer or layers of materials thereof, may have a desired flexibility such that the noise reducer 110 conforms to a flow streamline or mean flow streamline during operation of the turbine 10. For example, the downstream end of the second portion 126 may bend in the direction of the pressure side 22 or suction side 24 depending on the orientation of the noise reducer 110 and/or the angle of attack and due to the flow streamlines and/or mean flow streamline. In exemplary embodiments, the noise reducer 110 is thus adaptable to the mean flow streamline.

It should be understood that the noise reducer 110 of the present disclosure may be mounted to rotor blades 16 during the manufacture of the rotor blade 16, or may be retro-fit to existing rotor blades 16, to form rotor blade assemblies 100. The rotor blade assembly 100 including a rotor blade 16 and noise reducer 110 may desirably have decreased noise for a given wind flow.

The present disclosure is further directed to a method for reducing the noise of a rotor blade 16 for a wind turbine 10. The method may include mounting a noise reducer 110 to the rotor blade 16, as discussed above. The method may further include rotating the rotor blade 16 on the wind turbine 10, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
a rotor blade having surfaces defining a pressure side, a suction side, a leading edge, and a trailing edge extending between a tip and a root; and,
a noise reducer configured on a surface of the rotor blade, the noise reducer comprising a plurality of noise reduction features, each of the plurality of noise reduction features comprising:
a first surface comprising a first portion mounted to one of the pressure side or the suction side and a second portion configured to interact with wind flowing past the other of the pressure side or the suction side;
a second surface interrupting an aerodynamic contour of the one of the pressure side or the suction side, and
a first layer and a second layer, the first layer comprising the first portion and second surface of each of the plurality of noise reduction features and the second layer comprising the second portion, wherein the first layer is formed from an acoustic absorption material.

2. The rotor blade assembly of claim 1, wherein each of the plurality of second surfaces defines a width and a length, and wherein the width tapers in the direction of the wind flow through a portion of the length.

3. The rotor blade assembly of claim 1, wherein each of the plurality of second surfaces defines a height and a length, and wherein the height tapers in the direction of the wind flow through a portion of the length.

4. The rotor blade assembly of claim 1, wherein the second surface has a generally curvilinear cross-sectional profile.

5. The rotor blade assembly of claim 1, wherein the first portion is mounted to the suction side, the second portion is configured to interact with wind flowing past the pressure side, and the second surface interrupts the aerodynamic contour of the suction side.

6. The rotor blade assembly of claim 1, wherein the plurality of noise reduction features comprise a first noise reduction feature having a first aspect ratio and a second noise reduction feature having a second aspect ratio different from the first aspect ratio.

7. The rotor blade assembly of claim 1, wherein the noise reducer further comprises a base plate mounting each of the plurality of first portions to the one of the pressure side or the suction side.

8. The rotor blade assembly of claim 1, wherein the first portion is mounted within an outer board area of the rotor blade.

9. The rotor blade assembly of claim 1, wherein the noise reducer is configured adjacent the trailing edge of the rotor blade.

10. The rotor blade assembly of claim 1, wherein the second layer is at least one of stiffer or stronger than the first layer.

11. The rotor blade assembly of claim 1, wherein the first layer has an absorption coefficient in the range between approximately 0.6 and approximately 1.0.

12. The rotor blade assembly of claim 1, wherein the second layer is acoustically non-porous.

13. A wind turbine, comprising:

a plurality of rotor blades, each of the plurality of rotor blades having surfaces defining a pressure side, a suction side, a leading edge, and a trailing edge extending between a tip and a root; and, a noise reducer configured on a surface of at least one of the plurality of rotor blades, the noise reducer comprising a plurality of noise reduction features, each of the plurality of noise reduction features comprising:

a first surface comprising a first portion mounted to one of the pressure side or the suction side and a second portion configured to interact with wind flowing past the other of the pressure side or the suction side;

a second surface interrupting an aerodynamic contour of the one of the pressure side or the suction side; and a first layer and a second layer, the first layer comprising the first portion and second surface of each of the plurality of noise reduction features and the second layer comprising the second portion, wherein the first layer is formed from an acoustic absorption material.

14. The wind turbine of claim 13, wherein the plurality of noise reduction features comprise a first noise reduction feature having a first aspect ratio and a second noise reduction feature having a second aspect ratio.

15. The wind turbine of claim 13, wherein the noise reducer further comprises a base plate mounting each of the plurality of first portions to the one of the pressure side or the suction side.

16. The wind turbine of claim 13, wherein the first portion is mounted within an outer board area of the rotor blade.

17. The wind turbine of claim 13, wherein the noise reducer is configured adjacent the trailing edge of the rotor blade.

18. A method for reducing the noise of a rotor blade for a wind turbine, the method comprising:

mounting a noise reducer on a rotor blade, the noise reducer comprising a plurality of noise reduction features, each of the plurality of noise reduction features comprising a first surface comprising a first portion mounted to one of a pressure side or a suction side of the rotor blade and a second portion configured to interact with wind flowing past the other of the pressure side or the suction side, a second surface interrupting an aerodynamic contour of the one of the pressure side or the suction side, and a first layer and a second layer, the first layer comprising the first portion and second surface of each of the plurality of noise reduction features and the second layer comprising the second portion, wherein the first layer is formed from an acoustic absorption material; and, rotating the rotor blade on the wind turbine.

* * * * *